Jan. 9, 1951 P. LAZARE Re. 23,322
PAINTBOX
Original Filed May 8, 1947 2 Sheets-Sheet 1
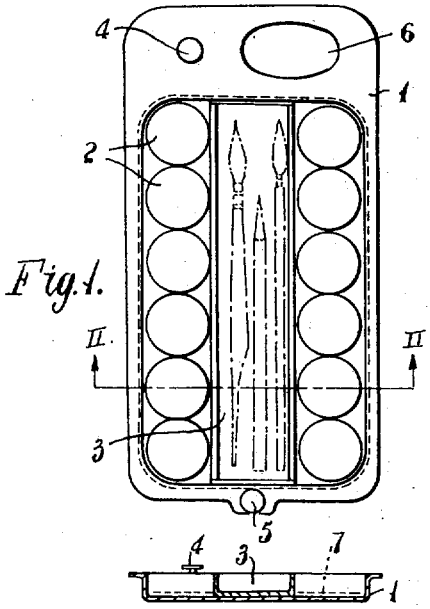
Fig. 1.
Fig. 2.
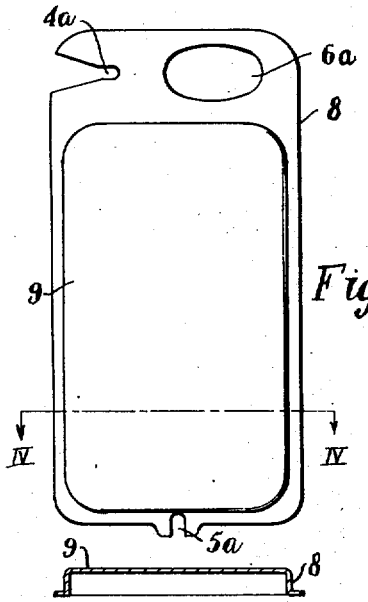
Fig. 3.
Fig. 4.
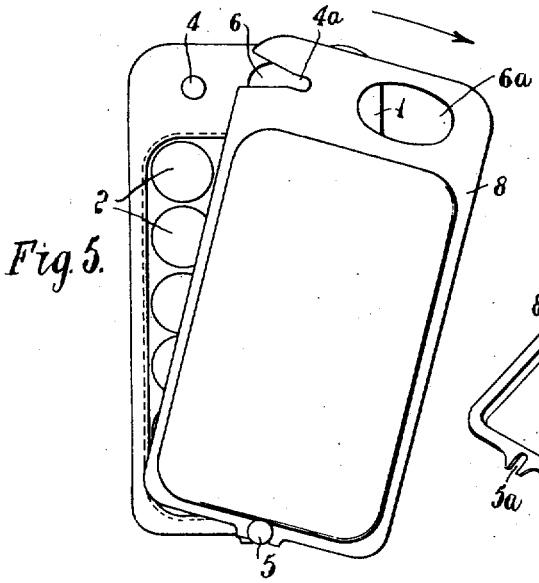
Fig. 5.
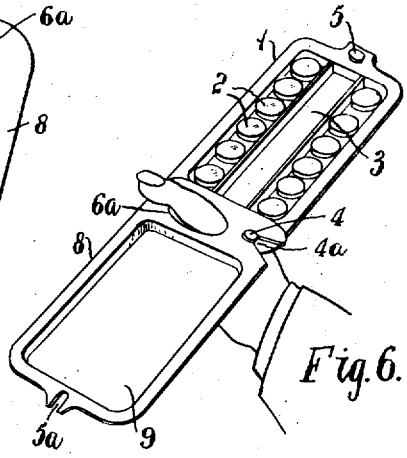
Fig. 6.
INVENTOR:-
PHILIPPE LAZARE.
BY [signature]
ATTORNEYS.

PAINTBOX

Original Filed May 8, 1947 2 Sheets-Sheet 2

INVENTOR:-

PHILIPPE LAZARE.

BY [signature]

ATTORNEYS.

Reissued Jan. 9, 1951

Re. 23,322

UNITED STATES PATENT OFFICE 23,322

PAINTBOX

Philippe Lazare, Marseille, France

Original No. 2,473,532, dated June 21, 1949, Serial No. 746,769, May 8, 1947. Application for reissue November 14, 1949, Serial No. 127,235. In France June 3, 1946

1 Claim. (Cl. 41—4)

My invention relates to containers having a flat integral flange and comprising a removable cover having a corresponding flange adapted to be closely fitted on said container flange.

One of the objects of my invention is to provide a novel system of closing these containers, said system permitting pivotally connecting the cover flange to the container flange at a suitable point thereof, to open or to tightly close the container by said cover in pivoting the same about said point, or to remove the cover, without using any conventional hinges or the like.

More specifically, the invention contemplates providing the said corresponding flanges of the container and its detachable cover with at least two stud and slot connections, the first one being adapted first to guide the cover flange towards an axis perpendicular to the container flange and afterwards to guide said cover about said axis while maintaining said cover in a defined plane, and the second to guide the cover to and to hold it in the closed position when the same is pivoted about said axis in order to tightly close the container.

A further object of my invention is to provide a container for various products and a cover therefor, said container and cover each comprising a flat integral flange adapted to be closely fitted one on the other, said flanges being provided with headed studs and slots to be engaged with each other to form the above described stud and slot connections.

In one form of the invention it is proposed to construct the flat integral flanges of the container and its detachable cover with thumb holes registering in the fully open position of the cover, said holes permitting holding the container and its cover with the thumb, whereby the cover may be attached to the container with its inner surface turned either upwards or downwards.

In order to illustrate my invention, I have selected and embodied my invention in and have shown in the accompanying drawings and will describe herein a paint box but it is understood that such showing and description is intended for illustrating purposes and is not intended to nor does it constitute a limitation of my invention.

Figure 7:
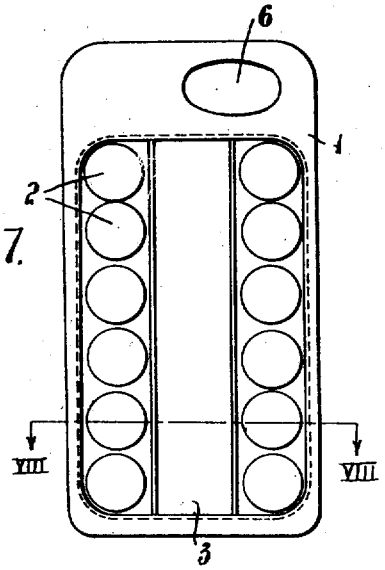
Figure 9:
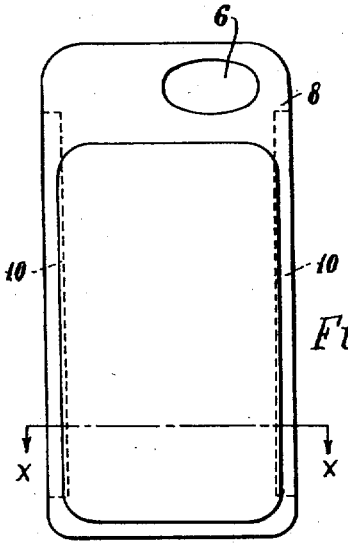
Figure 8:
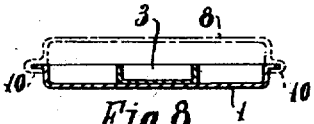
Figure 10:
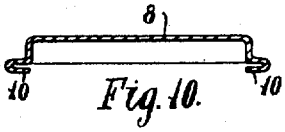
Figure 11:
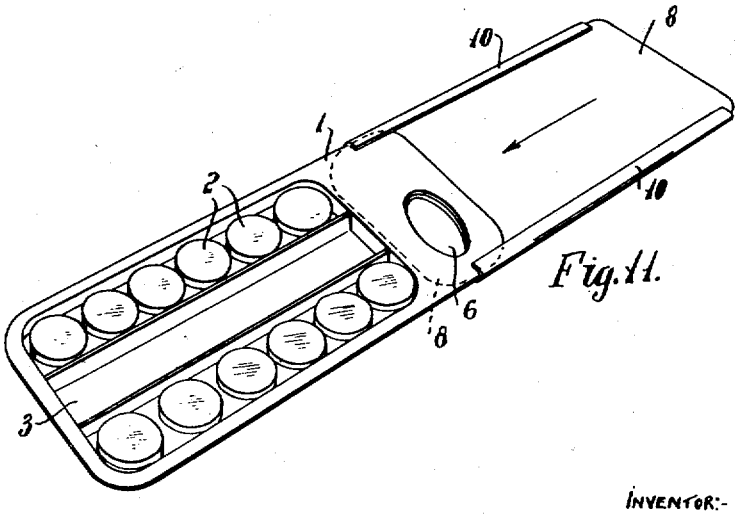

In the accompanying drawings:

Figure 1 shows a face view of the member containing the colours and the brushes; Fig. 2 is a transverse section taken at the line II—II, of the member shown in Fig. 1; Fig. 3 shows with the same conditions of illustration as Fig. 1, the member constituting the palette and the cover of the box; Fig. 4 is a transverse section following the line IV—IV of the members shown in Fig. 3; Fig. 5 shows the position of each of the principal members of this box in the opening position; Fig. 6 shows, to a larger scale, the box completely open in its position of use; Fig. 7 shows a face view of an alternative construction of the member containing the colours and the brushes; Fig. 8 shows an elevation of a section, taken at the line VIII—VIII, of the construction shown in Fig. 7; Fig. 9 shows with the same conditions of illustration as Fig. 7 an alternative construction of the member constituting the palette and the cover of the box; Fig. 10 shows an elevation of a section taken at the line X—X of the construction shown in Fig. 9; Fig. 11 shows a perspective view of the alternative construction completely open in its position of use.

In the first example shown the member 1 in Fig. 1 is preferably made of pressed metal to the form and dimensions required to constitute the paint box in which are placed the colours 2, blocks, tubes or the like with a case 3 to receive the brushes, pencils and other similar requirements. This member is furnished with two small pivots or headed studs 4 and 5 serving as fasteners and as means of movement of one member on the other.

A hole 6 allows the insertion of the thumb of the artist when the box is in use as in Fig. 6.

The colours 2 could again be disposed in a second support 7 fitting exactly into the member 1. This support 7 shown in broken lines in Fig. 2, is provided for the assistance of the artist who can thereby use the box with special decorating colours for workshop use or with ordinary colours for nature studies or again immediately convert this box from water colours to oil colours by placing the tubes on the member 7.

The removal of the support 7 facilitates the cleaning of member 1.

Member 8, shown in Figs. 3 and 4, constitutes both the cover of member 1 and the palette. For this purpose, its surface could have any reliefs, hollows or partitions required for its use and is shown in this construction with a dished portion 9. This member contains slots 4*a* and 5*a* of a suitable shape corresponding to the pivots 4 and 5 and the hole 6*a* corresponding to the part 6.

By the special construction of the two main members 1 and 8 it is immediately seen how easy it is for the artist to open, close and use this box as in the position in Fig. 6. The box forms a single unit which permits him to work with a maximum of rigidity between the box and the palette which always remains in the horizontal. The box permits the complete separation of the member 8 constituting the palette and the member 1 for cleaning without this cleaning affecting the colours contained in the member 1.

The invention is thus characterized by the use, thought to be for the first time, of a paint box for water colours in two principal members, the one forming a paint box, the other forming both a palette and a cover, the conceptions and dispositions of the above permitting them alternatively to fasten, one above the other as a closed paint box, or by their opening and turning in the same plane to form an open paint box with its palette ready for use.

In the second method of construction shown in Figs. 7 to 11, the members 1 and 8 remain the same, but the pivots 4 and 5 are omitted and are replaced by slideways 10 in Figs. 9 and 10 and 11. The slideways 10 are provided on the member 8 which still forms the cover of the box when it occupies the position shown in broken line in Fig. 8, the palette, by being inverted, occupying the position shown in Fig. 11.

This variation of construction retains the features of the invention in that the paint box has several members which can be separated.

The members constituting this paint box could be made of any suitable material, besides metal, and more particularly opaque, translucent or transparent plastic material of the type mentioned in the French Patent No. 908,936 of Feb. 2, 1945, of the same inventor.

The invention may be embodied in other specific forms than that represented in the accompanying drawings without departing from the spirit or essential attributes thereof, and it is therefore desired that the present embodiment be considered in all respects as illustrative and not restrictive, reference being made to the appended claim rather than to the foregoing description to indicate the scope of the invention.

I claim:

In a paint box and palette combination, a container having an integral flange, a cover for said container having a flange corresponding to that of said container adapted to be closely fitted on said container flange, a headed pivot stud on said container flange perpendicular thereto on its longitudinal axis, said cover flange having a first open slot along one end of its longitudinal axis to be engaged by said headed pivot stud, a second headed stud perpendicular to said container flange on the end of said container flange opposite said first pivot stud, the cover flange having a second open slot extending along the arc of a circle having for its center the axis of said first headed pivot stud, said second slot being adapted to be guided on said second stud when said first and second slots of said cover are to be engaged on said studs, respectively, to close said container, said second slot being engageable with said second stud in the same direction but with said cover turned upside down, said cover having a thumb hole for gripping the same in the end of said cover flange adjacent said second slot, said container having a corresponding thumb hole for gripping the same in the end thereof adjacent said second headed stud and registering with said cover thumb hole for gripping both said container and said cover simultaneously when they are assembled in prolongation of one another, said cover being turned upside down.

PHILIPPE LAZARE.

REFERENCES CITED

The following references are of record in the file of this patent:

UNITED STATES PATENTS

| Number | Name | Date |
|---|---|---|
| 743,269 | Godin | Nov. 3, 1903 |
| 1,642,138 | Billings | Sept. 13, 1927 |
| 2,064,241 | Batdorf | Dec. 15, 1936 |
| 2,165,345 | Conway | July 11, 1939 |